Sept. 16, 1930. H. BRACHTL 1,775,748
GROUNDING DEVICE
Filed Feb. 2, 1927
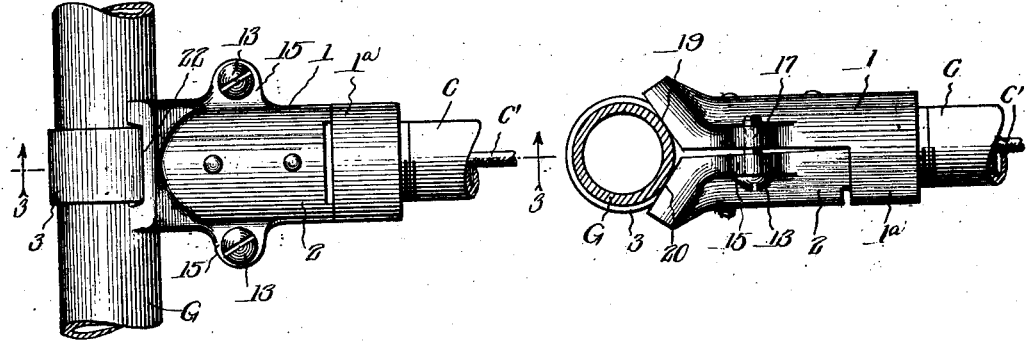
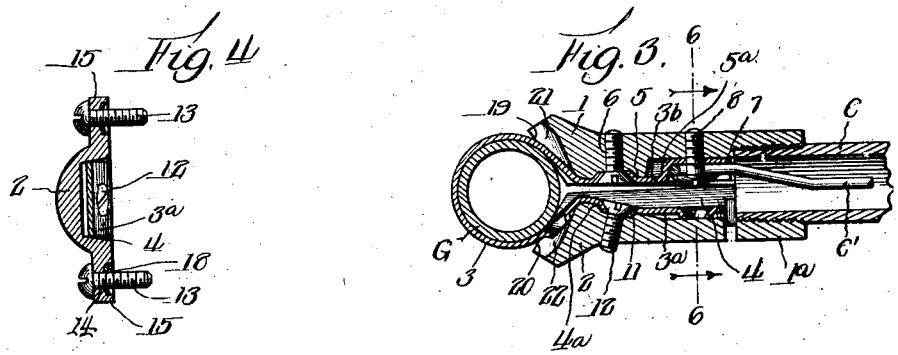
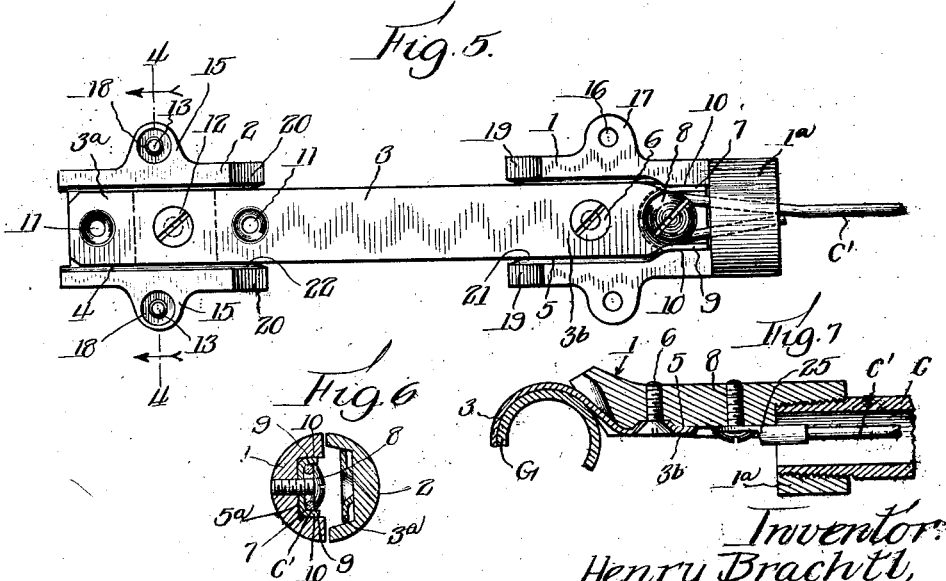
Inventor:
Henry Brachtl, Patented Sept. 16, 1930

1,775,748

UNITED STATES PATENT OFFICE

HENRY BRACHTL, OF CHICAGO, ILLINOIS, ASSIGNOR, BY MESNE ASSIGNMENTS, TO APPLETON ELECTRIC COMPANY, OF CHICAGO, ILLINOIS, A CORPORATION OF ILLINOIS

GROUNDING DEVICE

Application filed February 2, 1927. Serial No. 165,281.

This invention relates generally to an electrical connection and more particularly to a device adapted for use in grounding a conduit as well as a conductor enclosed therein.

It is the general object of the invention to provide such a device of new and improved construction which permits of ready and convenient installation.

Another object of the invention is to provide a grounding device of simple construction adapted to be mounted on a pipe conduit and to be secured effectively to a ground pipe, or as is generally the case, a water pipe, so as to resist vibration and to make efficient contact therewith.

Another object of the invention is to provide such a device comprising a two-part fitting, one part being secured at each end of a metallic clamping strap.

Another object is to provide a universal grounding device arranged to fit several sizes of ground pipe and which may be adjusted to the proper size before being applied so as to provide for ease and convenience in installation.

A further object is to provide in a device of this character, efficient means for connecting a ground conductor mechanically and electrically thereto.

In pursuance of the foregoing objects I aim to provide a device comprising a fitting having two complementary parts which are secured to the opposite ends of a connecting and clamping strap so that upon bending the strap around a ground pipe the said parts will register, the parts being of such form that by clamping them together the device is effectively secured to an electric connection made with the ground pipe.

Further objects and advantages of my invention will be understood from the following detailed description thereof, taken in connection with the accompanying drawings, in which Figure 1 is an elevation of the preferred form of the invention shown connecting a horizontal conduit to a vertical ground pipe.

Fig. 2 is a plan view thereof.

Fig. 3 is a section along the line 3—3 of Fig. 1.

Fig. 4 is a section along the line 4—4 of Fig. 5.

Fig. 5 is a view of the device assembled ready for application to a ground pipe.

Fig. 6 is a section along the line 6—6 of Fig. 3.

Fig. 7 is a fragmental section similar to Fig. 3, of a modified form of the invention.

For purposes of disclosure I have illustrated in the drawings and will hereinafter describe in detail two embodiments of the invention, with the understanding that I do not intend to limit the invention to the particular constructions and arrangements shown, it being contemplated that various changes may be made by those skilled in the art without departing from the spirit and scope of the appended claims.

As illustrated in Figs. 1 to 6, the exemplary embodiment of the invention is disclosed in conjunction with a ground or water pipe G to which it is desired to connect or "ground" a conduit C, and a conductor C' in the conduit. The grounding device consists generally of a two-part fitting comprising sections 1 and 2, a strap 3 secured therebetween (Figs. 3 and 5), and means to clamp the sections of the fitting together when the device has been installed.

The fitting sections 1, 2, as illustrated herein, are complementary in form, the part 1 having a tubular portion $1^a$ at the conduit end thereof, internally threaded to engage the conduit C. The remainder of the part 1 and the part 2 are substantially semi-cylindrical in form.

The metallic strap 3 is provided connecting the fitting sections as illustrated most clearly in Figs. 3 and 5. This strap, which is preferably of hard copper, is arranged with its end portion $3^a$ lying in a groove 4 formed in the fitting part 2, and with its end $3^b$ lying in a groove 5 in the part 1. The end $3^b$ may be secured to the part 1 by means of a countersunk screw 6 and is preferably provided with a trough-like portion 7 adjacent the conduit end of the fitting so that the end of the conductor C' may be positioned therein. Generally, the conductor is soldered in the trough of the strap in a well known manner, but to obtain an effective mechanical and electrical connection between the conductor C' and the strap 3, this trough portion of the strap is herein illustrated as fitted snugly into a deeper and narrower portion 5ᵃ of the groove 5 (Figs. 3, 5 and 6) and a headed screw 8 is entered through an aperture in the strap and into threaded engagement with the part 1. Thus by looping the end of the conductor around the stem of the screw 8 between the head of the screw and the bottom and side walls of the trough portion 7, the conductor may be clamped effectively therebetween. The sides 9 of the trough portion of the strap are supported by the walls 10 of the portion 5ᵃ of the groove in the fitting and are thereby restrained from flaring outwardly and the conductor is thereby constrained under the head of the screw which spans the trough.

To secure the opposite end of the strap to the fitting section 2 this end of the strap may be provided with a series of spaced apertures 11 through either of which a screw 12 may be entered into engagement with a threaded hole in the fitting.

The strap 3 is arranged to encircle the grounding pipe G, the apertures 11 being positioned so that the effective length of the strap may be adjusted to fit the device to various sizes of pipe. Thus with the fitting section properly secured to the strap, the fitting section 1 is secured to the end of the conduit C, and the conductor C' connected to the strap, the fitting part 2 may be grasped by a workman to serve as a handle and thereby facilitate the bending of the strap about the grounding pipe. The two sections of the fitting may then be clamped together with the strap surrounding and in contact with the pipe by means including screws 13 which are preferably carried on the fitting section 2. These screws may be entered through apertures 14 in lugs 15 on this part of the fitting and are arranged to engage threaded apertures 16 in corresponding lugs 17 on the part 1. The screws may be secured somewhat permanently to the part 2 by means of fibre washers 18 on the screws positioned in enlarged portions of the apertures 14 in the lugs 15.

To secure the device rigidly to the pipe G and in effective contact therewith, means is provided to insure an efficient clamping action between the strap 3 and the pipe and between the fitting and the pipe. This means comprises opposed beveled or cam surfaces 19, 20 on the ground pipe end of the parts 1, 2, which surfaces are arranged to engage the pipe G so that when the clamping screws 13 are tightened to draw the parts 1 and 2 together the cam surfaces clamp against the pipe and tension the strap 3. The cam surfaces are preferably formed at the side edges of the fittings and with grooves 21, 22, for the strap 3 therebetween, so that when clamped to a pipe G as shown in Fig. 1, the cam surfaces are spaced longitudinally of the pipe and thereby provide a rigid connection between the device and pipe so as to resist vibration and side strains on the conduit.

The apertures in the strap 3 are preferably formed as illustrated, i. e., with the metal driven into countersinks, so as to provide substantial bearing surfaces for the screws 6 and 12 and to overcome any tendency of the strap to tear due to the strains thereon. In addition, the groove 4 in the fitting section 2 is made shallow adjacent the cam surfaces 19, so that the strap 3 will be clamped in contact with as great a portion of the periphery of the pipe as is possible. With the screw 12 positioned against the inclined wall 4ᵃ of this groove the strain on the screw is also relieved.

In Fig. 7 is illustrated a modified form of the invention wherein the groove 5 of the fitting section 1 is of uniform depth and the strap portion 3ᵇ extends but a short distance beyond the screw 6. The conductor C' may be connected directly to the fitting section 1 by means such as a suitable lug 25 soldered thereto and clamped between the head of the screw 8 and the fitting.

From the foregoing it is apparent that the invention provides a device which is simple in construction, extremely rigid and durable in use, and which may be manipulated most conveniently during installation. The series of holes at one end of the strap permits both of the fitting parts to be secured to the strap before the device is installed and thereby provides a device which is unitary in character. With the part 1 threaded onto the end of a conduit and the conductor in the conduit secured by means of the screw 8, the part 2 provides a convenient head to grasp when bending the strap around the pipe G, and with the clamping screws 13 carried on this part, they are automatically positioned for engagement with the threaded apertures 16 in the fitting part 1. The simple operation of tightening these screws then clamps the fitting and the strap effectively to the ground pipe. The fitting and strap thereby serve to secure the conduit C effectively to the ground pipe G and to ground the conduit as well as the conductor.

I claim as my invention:

1. A device of the character described comprising two complementary parts one of which is arranged to be threaded onto the end of a conduit, a metallic strap having its opposite ends secured one to each of said parts and forming, when said parts are assembled, a loop adapted to surround a ground pipe, means to clamp said parts together, and means on said parts arranged to cam against such ground pipe to tighten said strap around the ground pipe by forcing said parts outwardly therefrom.

2. A grounding device comprising a fitting having two substantially semi-cylindrical sections, means on one section adapted for attachement to the end of a conduit, a metallic strap, means to secure one of said sections to one end of said strap, means to secure the other of said sections to any one of a plurality of predetermined positions on the other end of said strap, said sections being adapted to be installed with the strap looped around a ground pipe; means carried on one section adapted to engage the other to clamp said sections together when assembled, and means on said sections arranged to abut such ground pipe and to force said sections longitudinally outward from the ground pipe whereby to tension said strap and to secure the fitting rigidly thereto when the sections are clamped.

3. A grounding device comprising a fitting formed of two complementary parts, one of which is adapted to be secured to the end of a conduit, a metallic strap secured at its opposite ends to said parts, said parts having opposed beveled surfaces forming a V-notch, and means to clamp said parts together with the strap forming a loop extending from one end thereof arranged to surround a ground pipe positioned in said V-notch.

4. A device for connecting a conduit to a ground pipe comprising a two-part fitting having one part adapted at one end of the fitting to be secured to the end of a conduit, said parts at the other end of the fitting having laterally spaced and opposed beveled surfaces cooperating to form V-notches when the parts are assembled, and means to clamp said fitting to a ground pipe positioned in said V-notches.

5. A grounding device comprising, in combination, a member adapted to be threaded to a conduit and having a jaw arranged to abut a ground pipe, a metallic strap for encircling the ground pipe, one end of said strap being secured to said member, means on said member adapted electrically to connect said strap to a wire in the conduit, a second member secured to the other end of said strap and having a jaw arranged to abut the ground pipe and means for drawing said members together, said last mentioned means causing a tightening of the strap by drawing its ends together and by closing said jaws against the ground pipe to force said members outwardly from the pipe.

6. A grounding device comprising a fitting having two substantially semi-cylindrical sections, means on one section adapted for attachment to the end of a conduit, a metallic strap, means to secure one of said sections to one end of said strap, means to secure the other of said sections to the other end of said strap, said sections being adapted to be installed with the strap looped around a ground pipe and with the end of one section fulcrumed on the other section to permit a pivotal movement of one relative to the other, means carried on one section adapted to engage the other to draw said sections together when assembled, and means on said sections arranged to abut such ground pipe and to force said sections longitudinally outward from the ground pipe and thereby tension said strap.

7. A grounding device comprising, in combination, a member having its outer end adapted to be secured to a conduit, a metallic strap having one of its ends attached to the inner end of said member and adapted to surround a ground pipe, a second member attached at its inner end to the other end of said strap and having its outer end fulcrumed on the outer end of said first member, means for drawing the inner ends of said members together, and spaced beveled surfaces formed on the inner end of each of said members cooperating to form V-notches and adapted to abut directly against the ground pipe at spaced points on each member longitudinally of the ground pipe to hold the device rigid with the ground pipe when the strap is tightened.

8. In a grounding device, the combination of two complementary members having beveled inner ends which are adapted to abut against a ground pipe, the outer end of the first of said members being adapted to be secured to the end of a conduit, a metallic strap for surrounding the ground pipe and having its ends attached, one adjacent the inner end of each member, and means intermediate their ends for clamping said members together, said second member having its outer end fulcrumed on said first member and its inner end spaced from said first member to permit the inner end to be drawn toward the first member by the clamping means to cause said beveled ends to force the device longitudinally outward to tighten the strap.

In testimony whereof, I have hereunto affixed my signature.

HENRY BRACHTL.